Figure 1:
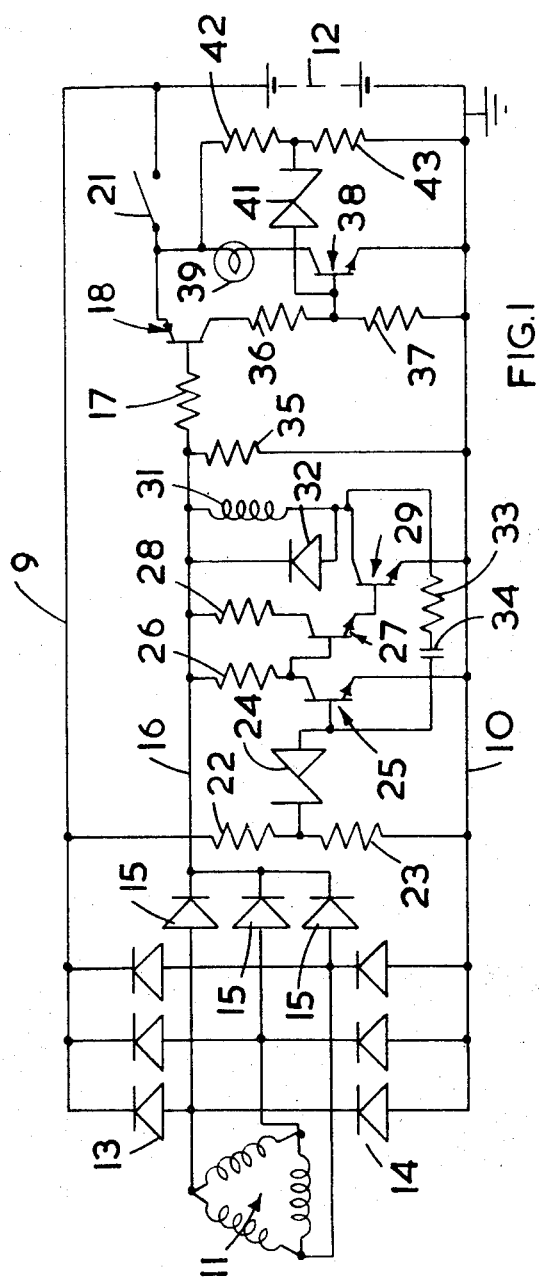

United States Patent [19]
Hill

[11] 3,764,879
[45] Oct. 9, 1973

[54] BATTERY CHARGING SYSTEMS FOR ROAD VEHICLES

[75] Inventor: William Frank Hill, Stafford, England

[73] Assignee: Joseph Lucas (Industries) Limited, Birmingham, England

[22] Filed: Jan. 24, 1972

[21] Appl. No.: 220,097

[30] Foreign Application Priority Data
Jan. 22, 1971  Great Britain..................... 2,939/71

[52] U.S. Cl..................................... 320/48, 322/99
[51] Int. Cl............................................... H02j 7/00
[58] Field of Search .................. 320/48, 61; 322/99, 322/73, 28

[56] References Cited
UNITED STATES PATENTS
3,593,102  7/1971  Kawashima et al................ 322/99 X Primary Examiner—J. D. Miller
Assistant Examiner—Robert J. Hickey
Attorney—John C. Holman et al.

[57] ABSTRACT

In a battery charging system for a road vehicle, an alternator with a field winding charges a battery connected between first and second supply lines, and also provides power to a third supply line. The voltage regulator of the system is connected between the third and second supply lines, and there is a high impedance series circuit connected between the first and second supply lines, including the vehicle ignition switch and an amplifying device which operates a warning device. Means is provided connecting the third line to the series circuit so that the warning device is rendered inoperative when the third and first supply lines are at substantially the same potential.

1 Claim, 3 Drawing Figures

BATTERY CHARGING SYSTEMS FOR ROAD VEHICLES

This invention relates to battery charging systems for road vehicles, of the kind comprising in combination an alternator having a field winding, a full wave rectifier through which the alternator supplies power to first and second supply lines between which the vehicle battery is connected, a third supply line coupled to the alternator through diodes so that when the alternator is producing an output the first and third supply lines are at substantially the same potential, and the voltage regulator at least part of which is connected in circuit with said field winding between the first and second supply lines.

In such systems, it is usual to interconnect the third and first supply lines by way of a warning lamp and the vehicle ignition switch in series, so that when the ignition switch is closed, a circuit to the warning lamp is completed by way of the voltage regulator and the warning lamp is illuminated. When the alternator produces an output, the third and first supply lines are at substantially the same potential and so the warning lamp is extinguished. However, a difficulty with such an arrangement is that it is possible for a fault to occur in the system whereby no current flows in the field winding of the alternator, so that the alternator ceases to produce an output and the third supply line is no longer at the same potential as the first supply line. If there is still a path between the warning lamp and the second supply line, then the warning lamp will be illuminated to indicate the fault, but it is quite probable that any fault occuring in the voltage regulator will also break the circuit from the warning lamp to the second supply line, so that the warning lamp will not be illuminated, and no warning will be given to the driver.

The object of the invention is to overcome this difficulty.

According to the invention, a battery charging system of the kind specified includes a high impedance series circuit interconnecting the first and second supply lines, said series circuit including the vehicle ignition switch and an amplifying device, the amplifying device serving to operate a warning device, and the system further including means connecting the third supply line to said series circuit whereby the warning device is rendered inoperative when the third and first supply lines are at substantially the same potential.

In the main system in which the third and first supply lines are interconnected through a warning lamp and the ignition switch in series, the problem explained above could be overcome by connecting a resistor between the third and second supply lines, so that there is a permanent path between the warning lamp and the second supply line permitting illumination of the warning lamp in the event of a fault. However, such an arrangement has the difficulty that in order to permit illumination of the warning lamp when the voltage regulator fails, the resistor connected between the third and second supply lines would have to be of relatively low resistance, and so it will dissipate a substantial amount of power, so that it will be extremely difficult to accommodate this resistor in the system. The arrangement of the invention has the advantage that the series circuit connected between the first and second supply lines has a high impedance, so that there is no substantial power dissipation in the series circuit. However, the amplifying device ensures that sufficient current is available to operate the warning device, which is preferably a warning lamp.

Figure 2:
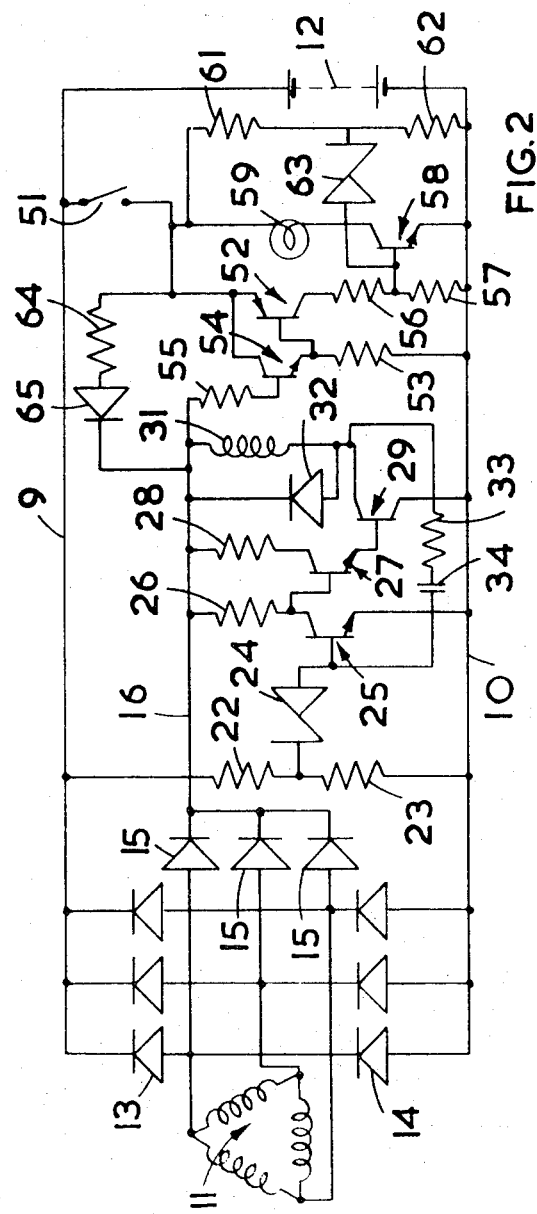
Figure 3:
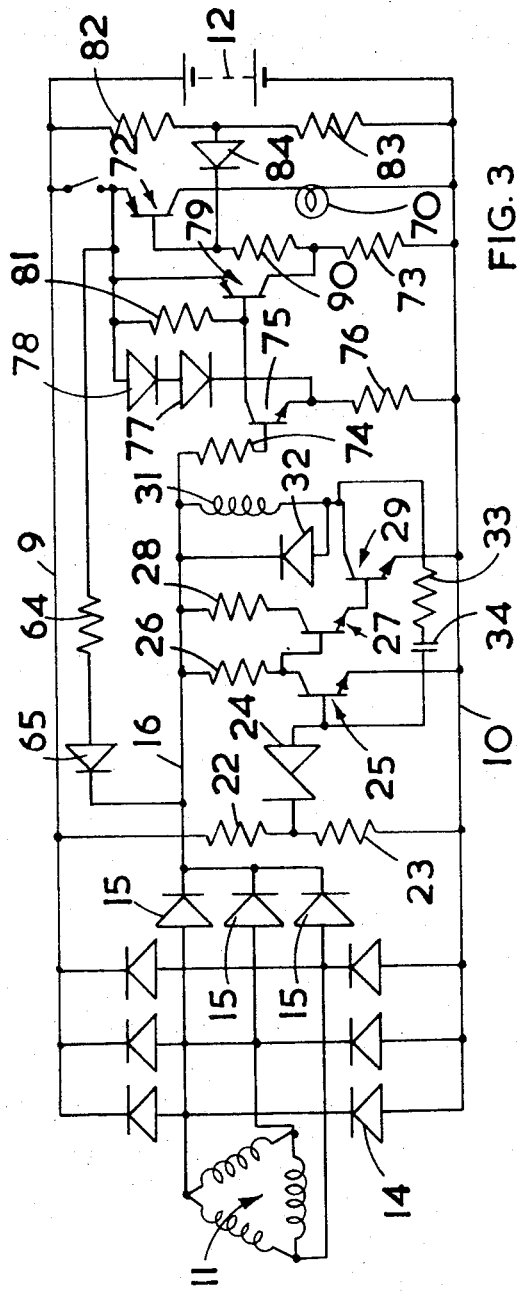

In the accompanying drawings, FIGS. 1 to 3 are circuit diagrams illustrating three examples of the invention.

Referring first to FIG. 1, there is provided an alternator 11 which supplies power through a full wave rectifier 13, 14 to first and second supply lines 9, 10 between which the battery 12 of a road vehicle is connected. The supply line 10 is conveniently earthed. The alternator also provides power through three additional diodes 15 to a third supply line 16.

Connected in series across the battery 12 are a pair of resistors 22, 23 the junction between which is connected through a Zener diode 24 to the base of an n-p-n transistor 25 having its emitter connected to the line 10 and its collector connected through a resistor 26 to the line 16, and further connected the base of an n-p-n transistor 27. The transistor 27 has its collector connected through a resistor 28 to the line 16 and its emitter connected to the base of an n-p-n transistor 29, the emitter of which is connected to the line 10 the collector of which is connected to the line 16 through the field winding 31 of the alternator 11. The field winding 31 is bridged by a diode 32 and the collector of the transistor 29 is connected to the base of the transistor 25 through a resistor 33 and a capacitor 34 in series.

Connected between the lines 9, 10 is a high impedance series circuit which includes the vehicle ignition switch 21, the emitter-base path of a p-n-p transistor 18, a resistor 17 and a resistor 35. The junction of the resistors 17 and 35 is connected to the line 16, and the collector of the transistor 18 is connected to the line 10 through a pair of resistors 36 and 37 in series. The junction of the resistors 36 and 37 is connected to the base of an n-p-n transistor 38 having its emitter connected to the line 10 and its collector connected through a warning lamp 39 to the emitter of the transistor 18. The base of the transistor 38 is further connected through a Zener diode 41 to the junctiuon of a pair of resistors 42, 43 connected between the emitter of the transistor 18 and the line 10.

When the ignition switch 21 is closed, current flows from the battery 12 through the switch 21, the emitter-base path of the transistor 18, the resistor 17 and the resistor 26 to turn on the transistors 27 and 29, so that current flows in the field winding 31 to provide initial excitation for the alternator. Conduction of the transistor 18 provides base current for the transistor 38, which turns on to illuminate the warning lamp 39. Current also flows through the resistor 35, but this resistor has a high resistance and so the current flowing through it is small.

As soon as the alternator 11 is charging the battery, then the diodes 15 will raise the potential of the line 16 approximately to the potential of the line 9 and so the base and emitter of the transistor 18 will be at substantially the same potential, and the transistor 18 will turn off, removing base current from the transistor 38 so that the warning lamp 39 is extinguished. Current for the transistors 27 and 29 is now provided by the output from the diodes 15. As long as the battery voltage is below a predetermined value the Zener diode 24 is non-conductive, and transistors 27 and 29 continue to conduct with transistor 25 off. However, when a predetermined battery voltage is reached the Zener diode 24 conducts to turn on the transistor 25, removing base current from the transistor 27. The regulating circuit then switches, by virtue of the feedback path 33, 34, between one state in which the transistor 25 is on and the transistors 27, 29 are off, and another state in which the transistor 25 is off and the transistors 27, 29 are on. The mark-space ratio is determined by the current flowing through the Zener diode 24, which in turn is determined by the battery voltage, so that a mean current flow is established in the winding 31 causing the battery 12 to be charged at a voltage which is predetermined by setting the resistor 23.

In the event that some fault occurs in the system whereby if the alternator 11 ceases to produce an output, then the potential on the line 16 will fall and the warning lamp 39 will again be illuminated. It will be noted that the warning lamp 39 will be illuminated even if the fault breaks the circuit by way of the resistor 28, for example if the fault is an earth fault on the transistor 29. This of course is because the high impedance path by way of the switch 21, transistor 18 and resistors 17, 35 is still completed, and the current flowing through the base-emitter of the transistor 18 is sufficient to operate the transistor 38 to illuminate the warning lamp 39.

The arrangement shown is also designed to give a warning if the battery should be over-charged. The resistor 42 and 43 constitute a potential divider across the battery, giving a voltage across the resistor 43 which is normally too low to permit appreciable conduction in the Zener diode 41. However, if the battery is being over-charged, the resulting increase in battery voltage increases the voltage across the resistor 43 sufficiently to permit the Zener diode 41 to conduct and to turn on the transistor 38, thereby illuminating the lamp 39. The warning lamp 39 can be used to indicate some other predetermined condition in the vehicle, for example low fuel level, or some fault, by arranging that the condition provides an oscillatory base current to the transistor 38 to turn it on and off, so that the lamp 39 flashes. In these circumstances, the lamp 39 would give three warnings. A flashing warning would give the indication referred to. Continuous illumination of the lamp 39 could mean either that the battery is not being charged, or is being over-charged. These two conditions can be distinguished readily by allowing the engine to fall to idling speed, and then turning on a substantial electrical load, for example the headlamps, whereupon the lamp 39 will remain illuminated if the battery is not being charged, but will be extinguished if the battery is over-charged. In another example, the transistor 38 is associated with a number of functions so that the transistor 38 conducts if any one of the functions is not performing satisfactorily. In these circumstances, test switches can be provided so that when the lamp 39 is illuminated, the switches can be utilised to find out which function is faulty.

If desired, the arrangement can be designed so that the warning lamp 39 is tested when the engine is first started. This can be done very simply by choosing the value of the resistor 17 so that the engine must be accelerated before the potential on the line 16 is sufficient to turn off the transistor 38 sufficiently to turn off the lamp 39.

Referring now to FIG. 2, the arrangement of the alternator with its supply lines 9, 10 and 16 and the voltage regulator is exactly the same as in FIG. 1. However, the high impedance series circuit connected between the lines 9 and 10 now includes the vehicle ignition switch 51, the emitter-base path of a p-n-p transistor 52 and a high value resistor 53. The required connection between this high impedance path and the line 16 is effected by way of an n-p-n transistor 54, the emitter of which is connected to the base of the transistor 52, the collector of which is connected to the emitter of the transistor 52 and the base of which is connected to the line 16 through a resistor 55. The transistor 52 has its collector further connected to the line 10 through resistors 56 and 57 in series, and the junction of the resistors 56 and 57 is connected to the base of an n-p-n transistor 58 the emitter of which is connected to the line 10 and the collector of which is connected through a warning lamp 59 to the emitter of the transistor 52. The emitter of the transistor 52 is further connected through resistors 61 and 62 in series to the line 10, and the junction of the resistors 61 and 62 is connected through a Zener diode 63 to the base of the transistor 58. Moreover, the line 16 is connected to the junction of the switch 51 and lamp 59 by way of a diode 65 and a resistor 64 in series.

When the switch 51 is closed, current flows through the resistors 64 and the diode 65 to the line 16 and thence by way of the resistor 26 and the base-emitter power to the transistors 27 and 29 to energise the field winding 31 and provide the required initial excitation. However, the value of the resistor 64 is such that the current flowing through it is insufficient to turn on the transistor 54. Current also flows through the ignition switch 51 and the emitter-base part of the transistor 52 and the resistor 53 to turn on the transistor 52, the transistor 54 being off at this stage. Current flowing through the transistor 52 turns on the transistor 58 to illuminate the warning lamp 59.

When the alternator is producing an output, current flows from the line 16 through the resistor 55 and the base-emitter of the transistor 54 to turn on the transistor 54, removing base current from the transistor 52 so that the transistors 52 and 58 are turned off and the lamp 59 is extinguished.

In the event of a fault causing the potential on the line 16 to fall, the transistor 54 will be off, but the high impedance path will still be present, turning on the transistors 52 and 58 to illuminate the lamp 59.

The resistors 61, 62 and Zener diode 63 operate in the same way as the equivalent components 42, 43 and 41 in FIG. 1 to indicate overcharging of the battery.

Referring now to FIG. 3, once again the connections of the alternator and the voltage regulator are the same as in FIG. 1. However, in this example the high impedance series circuit connected between the lines 9, 10 includes the vehicle ignition switch 71, the emitter-base path of a p-n-p transistor 72, a resistor 90 and a high value resistor 73. The connection between the lines 16 and the series circuit includes a resistor 74 connecting the line 16 to the base of an n-p-n transistor 75, the emitter of which is connected to the line 10 through a resistor 76 and is also connected through a pair of diodes 77, 78 in series to the emitter of the transistor 72, the diodes 77 and 78 serving to set the emitter potential of the transistor 75. The collector of the transistor 75 is connected through a resistor 81 to the emitter of the transistor 72, and is also connected to the base of a p-n-p transistor 79 having its emitter connected to the emitter of the transistor 72 and its collector connected to the junction of the resistors 90, 73. The transistor 72 has its collector connected through the warning lamp 70 to the line 10, and the lines 9, 10 are bridged by a pair of resistors 82, 83, the junction of which is connected through a Zener diode 84 to the base of the transistor 72. Moreover, the junction of the switch 71 and the emitter of the transistor 72 is connected through a resistor 64 and a diode 65 in series to the line 16.

When the ignition switch 71 is closed, the resistor 64 and diode 65 act in the same way as in FIG. 2 to provide initial excitation, but do not turn on the transistor 75. Closing of the switch 71 also turns on the transistor 72 to illuminate the lamp 70. When the line 16 receives an output from the alternator, current flows through the resistor 74 to turn on the transistor 75, which provides base current to the transistor 79 so that the transistor 79 turns on and removes base current from the transistor 72 so that the warning lamp 70 is extinguished. In the event of a fault, the transistors 75 and 79 remain off, but the transistor 72 is still turned on by current flowing through the high impedance series circuit, so that the warning lamp 70 is illuminated. The resistors 82, 83 and Zener diode 84 perform the same function as the components 42, 43 and 41 in FIG. 1.

I claim

1. A battery charging system for a road vehicle, comprising in combination an alternator having a field winding, a full wave rectifier through which the alternator supplies power to first and second supply lines, a battery connected between said supply lines, a third supply line, diodes coupling the alternator to the third supply line so that when the alternator is producing an output the first and third supply lines are at substantially the same potential, a voltage regulator at least part of which is connected in circuit with said field winding between the first and second supply lines, a high impedance series circuit interconnecting the first and second supply lines, said series circuit including the vehicle ignition switch, the base-emitter of a transistor and a high value resistor, means coupling the junction of said high value resistor and said transistor to the third supply line, means operable by the collector current of said transistor for controlling a warning device, said warning device being rendered inoperative when the third and first supply lines are at substantially the same potential, and means for operating said warning device when the voltage of the battery exceeds a predetermined value.

* * * * *